US008883957B2

(12) United States Patent
Magnet et al.

(10) Patent No.: US 8,883,957 B2
(45) Date of Patent: Nov. 11, 2014

(54) PROCESS FOR THE PREPARATION OF POLYLACTONES AND POLYLACTAMS

(75) Inventors: Stéphanie Magnet, Morlanne (FR); Christophe Navarro, Lahonce (FR); Stéphanie Gazeau-Bureau, Frouzins (FR); Bianca Martin-Vaca, Toulouse (FR); Didier Bourissou, Plaisance du Touch (FR)

(73) Assignees: Arkema France, Colombes (FR); Centre National de la Recherche Scientifique-CNRS, Paris Cedex (FR)

( * ) Notice: Subject to any disclaimer, the term of this patent is extended or adjusted under 35 U.S.C. 154(b) by 476 days.

(21) Appl. No.: 12/527,113

(22) PCT Filed: Feb. 15, 2008

(86) PCT No.: PCT/FR2008/050255
§ 371 (c)(1),
(2), (4) Date: Aug. 13, 2009

(87) PCT Pub. No.: WO2008/104723
PCT Pub. Date: Sep. 4, 2008

(65) Prior Publication Data
US 2010/0121021 A1    May 13, 2010

(30) Foreign Application Priority Data

Feb. 16, 2007 (FR) ..................................... 07 01148

(51) Int. Cl.
| *C08G 63/08* | (2006.01) |
| *D01F 6/62* | (2006.01) |
| *C08G 63/82* | (2006.01) |
| *C08L 101/00* | (2006.01) |
| *C08G 69/24* | (2006.01) |
| *D01F 6/60* | (2006.01) |
| *C08J 5/22* | (2006.01) |
| *C08G 69/14* | (2006.01) |
| *C08G 69/16* | (2006.01) |
| *C08G 63/81* | (2006.01) |
| *C08L 67/04* | (2006.01) |
| *C08L 77/02* | (2006.01) |

(52) U.S. Cl.
CPC .............. *C08G 63/823* (2013.01); *D01F 6/625* (2013.01); *C08G 63/08* (2013.01); *C08L 101/00* (2013.01); *C08J 2367/04* (2013.01); *C08G 69/24* (2013.01); *C08L 2201/04* (2013.01); *C08L 67/04* (2013.01); *D01F 6/60* (2013.01); *C08L 77/02* (2013.01); *C08J 5/2256* (2013.01); *C08G 69/14* (2013.01); *C08G 69/16* (2013.01); *C08G 63/81* (2013.01)
USPC ........... 528/354; 528/173; 528/271; 528/313; 528/318

(58) Field of Classification Search
USPC .......................... 528/173, 271, 313, 318, 354
See application file for complete search history.

(56) References Cited

U.S. PATENT DOCUMENTS

| 2,879,260 | A | 3/1959 | Caldwell et al. |
| 2,977,385 | A | 3/1961 | Fowler et al. |
| 3,557,255 | A | 1/1971 | Sharkey |
| 3,655,631 | A | 4/1972 | Fraser et al. |
| 3,657,385 | A | 4/1972 | Matzner et al. |
| 3,721,652 | A | 3/1973 | Barnes |
| 4,316,001 | A | 2/1982 | Boileau et al. |
| 4,452,973 | A | 6/1984 | Casey et al. |
| 4,629,624 | A | 12/1986 | Grouiller et al. |
| 4,873,296 | A | 10/1989 | Ciaperoni et al. |
| 5,183,861 | A | 2/1993 | Riffle et al. |
| 5,254,668 | A | 10/1993 | Dominguez |
| 5,399,666 | A | 3/1995 | Ford |
| 5,416,171 | A | 5/1995 | Chung et al. |
| 5,840,811 | A | 11/1998 | Hori et al. |
| 7,999,061 | B2 * | 8/2011 | Martin-Vaca et al. ......... 528/354 |
| 2006/0147490 | A1 * | 7/2006 | Bowden et al. ............... 424/426 |
| 2006/0149030 | A1 * | 7/2006 | Martin-Vaca et al. ......... 528/354 |
| 2008/0118860 | A1 * | 5/2008 | Harada et al. .............. 430/270.1 |

FOREIGN PATENT DOCUMENTS

| CN | 1 775 817 | 5/2006 |
| EP | 0 596 704 | 5/1994 |
| EP | 0899274 A1 | 3/1999 |
| EP | 1 614 714 | 1/2006 |
| GB | 766 347 | 1/1957 |
| GB | 1 201 909 | 8/1970 |
| GB | 1 251 046 | 10/1971 |
| JP | 60 067446 | 4/1985 |
| JP | 61 037814 | 2/1986 |
| JP | 01108226 A1 | 4/1989 |
| JP | 03 109419 | 5/1991 |
| JP | 04153215 A1 | 5/1992 |

(Continued)

OTHER PUBLICATIONS

Baśko et al (Cationic copolymerization of ∈-caprolactone and L,L-lactide by an activated monomer mechanism, Journal of Polymer Sci, vol. 44, pp. 7071-7081, published on line Nov. 13, 2006).*
Hiki S et al., "Synthesis and characterization of Hydroxy-Terminated [RS]-Poly(3-hydroxybutyrate) and its utilization to block copolymerization with 1-lactide to obtain a biodegradable thermoplastic elastomer", Polymer, Elsevier Science Publishers B.V., GB, vol. 41, No. 20, Sep. 2000, pp. 7369-7379, XP004200600, ISSN: 0032-3861.
Hoecker H., et al., Ring-Opening Polymerization by Various Ionic Processes, Macromol. Symp. (2000), vol. 157, p. 71-76.

(Continued)

*Primary Examiner* — Gregory Listvoyb
(74) *Attorney, Agent, or Firm* — RatnerPrestia

(57) ABSTRACT

The present invention relates to a process for the preparation of a lactone or lactam homopolymer, comprising the stage consisting in reacting a lactone or lactam with a nonpolymeric initiator comprising at least one hydroxyl or thiol functional group in a nonchlorinated solvent in the presence of a sulfonic acid of formula R—SO$_3$H.
It also relates to the polymer composition thus obtained and to its uses, in particular as antistatic additive.

19 Claims, No Drawings

(56) References Cited

FOREIGN PATENT DOCUMENTS

| JP | 06 293824 | 10/1994 |
| --- | --- | --- |
| JP | 06329790 A1 | 11/1994 |
| JP | 07025993 A1 | 1/1995 |
| JP | 08188627 A1 | 7/1996 |
| JP | 09067430 A1 | 3/1997 |
| JP | 09077855 A1 | 3/1997 |
| JP | 11 255870 | 9/1999 |
| JP | 2005-042058 | 2/2005 |
| JP | 2005-042059 | 2/2005 |
| WO | WO 00/77072 | 12/2000 |
| WO | WO2004/067602 | 8/2004 |

OTHER PUBLICATIONS

Jerome, R. et al., Contribution of Unsymmetrical Difunctional Initiators/Monomers to the Macromolecular Engineering, Macromol. Symp., (2002), vol. 177, pp. 43-59.

Lou X. et al., Living Cationic Polymerication of $O'$-Valerolactone and Synthesis of High Molecular Weight Homopolymer and Asymmetric Telechelic and Block Copolymer, Center for Ed. and Res. on Macromolecules (cerm), University of Liège, American Chemical Society, (2002), vol. 35, No. 4, pp. 1190-1195.

Penczek S., et al., Controlled Polymerization of Cyclic Esters Structure of Initiators and of Active Species Related to the Selectivity of Initiation and Propagation, (1998), vol. 128, pp. 241-254.

Shibasaki Y., et al., Activated Monomer Cationic Polymerization of Lactones and the Application to Well-Defined Block Copolymer Synthesis with Seven-Membered Cyclic Carbonate (2000), vol. 33, pp. 4316-4320.

Wilson B.C., et al., A Recoverable, Metal-Free Catalyst for the Green Polymerization of $\in$-Caprolactone, Macromolecules, (2004), vol. 37, No. 26, pp. 9709-9714.

International Search Report PCT/FR2008/050256.

Basko M. et al., Cationic copolymerization of e-caprolactone and L,L-lactide by an activated monomer mechanism, Journal of Polymer Science: Part A; Polymer Chemistry, vol. 44, 2006, pp. 7071-7081.

International Search Report dated Aug. 5, 2008.

\* cited by examiner

PROCESS FOR THE PREPARATION OF POLYLACTONES AND POLYLACTAMS

This is a U.S. National Phase application of application number PCT/FR2008/050255, filed Feb. 15, 2008, which claims priority benefit of FR0701148, filed Feb. 16, 2007 (both of which are incorporated herein by reference in their entirety)

FIELD OF THE INVENTION

The present invention relates to a process for the preparation of homopolymers of lactones and of lactams.

BACKGROUND OF THE INVENTION

Polycaprolactones are polymers which are of a certain industrial interest in various fields, due in particular to their biocompatibility, their physicochemical properties and their good thermal stability up to temperatures of at least 200-250° C.

Conventionally, the preparation of homopolymers by ring opening involves ionic polymerization mechanisms or coordination/insertion polymerization mechanisms. These polymerizations are mainly initiated by metal complexes, such as alkyl- or arylalkali metals (in the case of anionic polymerization) or metal alkoxides (in the case of coordination/insertion polymerization). In the latter, mention may be made of aluminum, tin, zinc, iron, scandium, titanium or yttrium derivatives. The metal derivatives may possibly assist in the attack of the alkoxide on the monomer by coordination of the reactive functional group of the ring (ester or amide functional group respectively in the case of lactones or lactams). Penczek et al. describe, in Macromol. SymP, 128, 241-254 (1998), the preparation of polyesters by ring opening in the presence of aluminum alkoxides. In 2000, Hawker et al. provided for the opening of lactams by tin, titanium and magnesium complexes (Macromol. SymP, 157, 71-76 (2000)). In 2002, Jérôme et al. described the preparation of polylactones and polylactides by ring opening using dialkylaluminum alkoxides (Macromol. SymP, 177, 43-59 (2002)). More recently, patents JP2005042059 and JP2005042058 claimed the use of titanium derivatives (titanium tetraisopropoxide) as metal catalysts for opening the ε-caprolactone ring.

However, the presence of metal compounds employed in these polymerization processes can have a harmful effect on the stability and/or the performance of the polymers synthesized as a result of potential interactions with the polymer matrix or with other components participating in the formulation in the application. Furthermore, it is well known that metal salts catalyze the decomposition of polymer matrices, such as polycarbonate, during the use thereof or are undesirable when these polymers are used in biomedical applications.

It is therefore necessary to carry out a stage of purification of the final reaction medium in order to remove residual metal traces. This postpolymerization treatment stage is particularly problematic and can prove to be expensive for an effectiveness which is sometimes debatable.

Alternative processes which do not resort to metal catalysts have consequently been provided. These processes employ acids which act as catalyst by activating the reactive functional group of the monomer (ester or amide functional group respectively in the case of lactones or lactams). These cationic polymerization mechanisms then make it possible to dispense with the use of organometallic complexes in the reaction medium.

In particular, it has been suggested, by Endo et al., Macromol., 2000, 33, 4316-4320 and Jérôme et al., Macromol., 2002, 35, 1190-1195, to polymerize ε-caprolactone in the presence of ethereal hydrochloric acid (HCl.Et$_2$O) and of n-butanol in dichloromethane at 25° C. The first authors use a monomer concentration of 1 mol.l$^{-1}$ and up to 5 equivalents of acid with respect to the alcohol and obtain, after 24 h, polymers with maximum weights $M_n$ of 10 300 g/mol (measured by gel permeation chromatography or GPC), with a polydispersity index of 1.15. The second authors use a monomer concentration of 4 mol.l$^{-1}$ and 3 equivalents of acid with respect to the alcohol, and the polymers obtained after 29 h exhibit maximum weights $M_n$ of 11 000 g/mol (i.e., approximately 20 000 with polystyrene calibration) and a polydispersity index of 1.25.

In the literature, only polycaprolactones having molecular weights $M_n$ of less than 15 000 g/mol have been synthesized according to the above process. In addition, the use of this process requires very long reaction times, which negatively affect the economics of these processes, and the use of corrosive acid, which may detrimentally affect the equipment used.

Other processes for the cationic polymerization of ε-caprolactone have been provided which involve a sulfonic acid as catalyst instead of hydrochloric acid.

Thus, Jones et al., Macromol., 2004, 37, 9709-9714, have published the polymerization of ε-caprolactone in the presence of para-toluenesulfonic acid and of benzyl alcohol in toluene at 52° C. in order to result, after 5 h 30, in polymers with weights $M_n$ of less than 9500 g/mol with a polydispersity index of 1.61. They have also used n-propylsulfonic acids supported on silica under the same conditions but the polymers obtained exhibited weights of less than 6500 g/mol for polymerization times of greater than 27 h.

Neither do these processes make it possible to prepare polycaprolactones having a possibly high molecular weight $M_n$ with a low polydispersity index. This is because the reaction is usually difficult to control, it being possible in particular for undesirable transesterification reactions to occur, so that it is not always easy to obtain polymers having the expected homogeneity in chain length. In addition, these processes exhibit the disadvantage of having to be carried out under hot conditions, which can be harmful to their economics.

Another process for the homopolymerization of caprolactone has been described by Maigorzata Basko et al. in Journal of Polymer Science: Part A: Polymer Chemistry, Vol. 44, 7071-7081 (2006). It consists in reacting ε-caprolactone in the presence of isopropyl alcohol and of trifluoromethanesulfonic (triflic) acid in dichloromethane at 35° C. A polycaprolactone having a molecular weight $M_n$ of 3100 g/mol and a polydispersity index of 1.05 can thus be obtained. While this process makes it possible to limit the transesterification reactions, it exhibits, however, the disadvantage of having excessively slow kinetics, in particular for high molecular weights $M_n$.

SUMMARY OF THE INVENTION

It would therefore be advantageous to have available a novel process which makes it possible to prepare polycaprolactones and also other polylactones and polylactams with a low polydispersity index, optionally having a high molecular weight $M_n$, according to an economical process involving in particular short reaction times and preferably a relatively low temperature, and in the absence of any trace of metal entity.

In point of fact, the Applicant Company has discovered that this need can be met by using certain specific sulfonic acids as catalysts and by carrying out the process in a nonchlorinated solvent.

A subject matter of the present invention is thus a process for the preparation of a polylactone or polylactam, comprising the stage consisting in reacting a lactone or lactam with a nonpolymeric initiator in a nonchlorinated aromatic solvent in the presence of a sulfonic acid of formula R—SO$_3$H, where R denotes:

a linear alkyl group including from 1 to 20 carbon atoms or a branched or cyclic alkyl group including from 3 to 20 carbon atoms which are optionally substituted by one or more substituents chosen independently from oxo and halo groups, such as, for example, fluorine, chlorine, bromine or iodine, or an aryl group optionally substituted by at least:
  one linear alkyl substituent including from 2 to 20 carbon atoms or one branched or cyclic alkyl group including from 3 to 20 carbon atoms, said alkyl substituent being itself optionally substituted by at, least one halogen group chosen from fluorine, chlorine, bromine or iodine or by a nitro group, or
  one halogen group chosen from fluorine, chlorine, bromine or iodine, or
  one nitro group, or
  one CR$_1$R$_2$R$_3$ group, where R$_1$ denotes a halogen atom and R$_2$ and R$_3$ independently denote a hydrogen atom or a halogen atom.

Another subject matter of the invention is a polymer composition which is capable of being obtained according to the above process and which will now be described in more detail.

DETAILED DESCRIPTION OF THE INVENTION

The process according to the invention can be described as organocatalytic.

As a preliminary, it is specified that the expression "between" used in the context of this description should be understood as including the limits mentioned.

The process according to the invention comprises the reaction of a lactone or lactam with a nonpolymeric initiator, hereinafter more simply denoted by "initiator". "Initiator" is understood to mean, in the present description, a compound comprising at least one hydroxyl functional group or at least one thiol functional group. The term "polymeric" refers to a molecule, the structure of which essentially comprises the multiple repetition of units derived, effectively (by any type of polymerization reaction) or conceptually, from molecules with a lower molecular weight. This term encompasses both polymers (macromolecules) and oligomers, the latter having a lower molecular weight than the former.

"Homopolymer" is understood to mean in particular a polymer derived from only one monomer entity.

Examples of lactones comprise more particularly saturated or unsaturated and substituted or unsubstituted β-, γ-, δ- and ε-lactones comprising from 4 to 12 carbon atoms, such as ε-caprolactone, δ-valerolactone, β-butyrolactone and γ-butyrolactone. ε-Caprolactone is preferred for use in the present invention. It can in particular be obtained by Baeyer-Villiger oxidation of cyclohexanone with peracetic acid.

Examples of lactams comprise more particularly saturated or unsaturated and substituted or unsubstituted β-, γ-, δ- and ε-lactams including from 4 to 12 carbon atoms, such as caprolactam, pyrrolidinone, piperidone, enantholactam and laurinlactam. Caprolactam is preferred for use in the present invention. It can be obtained from cyclohexane oxime, by a Beckmann rearrangement, and results, by polymerization, in polycaprolactam or Nylon-6®.

The concentration of the lactone or lactam in the reaction medium can vary to some extent. It has thus been demonstrated that, for a degree of polymerization of approximately 40, a high concentration of monomer makes possible better control of the initiation of the polymerization by the initiator and thus better control of the polymerization. On the other hand, in the case of higher degrees of polymerization (in particular of greater than 100), a medium which is more dilute in monomer may become more favorable to better control. By way of example, the concentration of lactone or lactam in the reaction medium can vary from 0.01 to 9 mol/l and preferably from 0.45 to 3 mol/l, indeed even from 0.45 to 2.7 mol/l.

The initiator can be a compound of formula CH(Ra)(Rb)(XH) where X denotes O or S and Ra and Rb independently denote a hydrogen atom, a linear or branched C$_1$-C$_{22}$, preferably C$_1$-C$_6$, alkyl group, an aryl group, such as in particular phenyl or naphthyl, or an arylalkyl group, the alkyl chain of which includes from 1 to 22 carbon atoms, it being possible for Ra and Rb to independently carry at least one XH group as defined above.

According to a preferred embodiment of the invention, the initiator comprises at least one hydroxyl functional group (X=O) and is in particular a primary alcohol (Rb=H), for example chosen from methanol, ethanol, n-propanol, n-butanol, n-pentanol, n-hexanol, neopentyl alcohol, benzyl alcohol, and their mixtures, in particular when the lactone is ε-caprolactone.

The initiator can also result from the family of the hydroxylated bioresourced or low-weight natural compounds, among which may be mentioned bioethanol, starch, chitin, chitosan, dextran, cellulose, propanediol, glycerol, propylene glycol, isosorbide, xylitol, mannitol, maltitol, erythritol and more generally natural molecules of the family of the monosaccharides, such as fructose, ribose and glucose.

In an alternative form, the initiator can comprise at least one thiol functional group and can, for example, be chosen from methanethiol, n-propyl mercaptan, isopropyl mercaptan, butyl mercaptan, pentyl mercaptan, n-octyl mercaptan, t-nonyl mercaptan, n-dodecyl mercaptan, t-dodecyl mercaptan, 2-mercaptoethanol, 2-(4-methylcyclohex-3-enyl)propane-2-thiol and their mixtures.

Preferably, the molar ratio of the lactone or lactam to the nonpolymeric initiator ranges from 5 to 500, more preferably from 10 to 200 and better still from 40 to 100.

The process according to the invention is advantageously carried out in an anhydrous medium and in any case in a nonchlorinated solvent, preferably in an aromatic solvent, such as toluene, ethylbenzene or xylene, or, in an alternative form, in a nonaromatic solvent, such as ketones (including methyl ethyl ketone and methyl isobutyl ketone) and ethers and polyethers which are optionally cyclic (including methyl tert-butyl ether, tetrahydrofuran, dioxane and dimethoxyethane). Toluene is preferred for use in the present invention. This is because it has been demonstrated that this type of solvent makes it possible in particular to accelerate the polymerization.

In addition, the reactants used in this process are preferably dried before they are employed, in particular by treatment under vacuum, distillation or drying with an inert drying agent.

The process according to the invention requires the use of a catalyst which comprises, or is preferably composed of, a sulfonic acid of formula R—SO$_3$H as defined above, in particular (trifluoro)methanesulfonic acid, that is to say methanesulfonic acid or trifluoromethanesulfonic acid. The expression "sulfonic acid" is understood to mean a compound in the free acid form and not in the salt form. The catalyst is advantageously added to the reaction medium after introduction of the lactone or lactam and the initiator. The process involved is preferably a homogeneous catalysis process, in the sense that the catalyst is present usually in the same phase as the reactants (lactone or lactam, and initiator) and not in the supported form. It is possible to vary the amount of catalyst employed in the process in order to adjust the reaction time without affecting the control of the polymerization. Usually, it is preferable, however, for the molar ratio of the sulfonic acid of formula R—$SO_3$H to each hydroxyl or thiol functional group of the initiator to be between 0.5 and 1. The catalyst can be easily removed at the end of the reaction by neutralization using a hindered organic base, such as diisopropylethylamine (DIEA), followed by removal of the ammonium salts thus formed, preferably by washing with water.

It is preferable for the process according to the invention not to employ a metal entity.

This process is preferably carried out at a temperature ranging from 20° C. to 105° C., more preferably from 25° C. to 65° C. and better still from 25° C. to 50° C. This is because it has been demonstrated that it is possible to obtain, at these temperatures, for example at approximately 30° C., lactone or lactam homopolymers having molecular weights $M_n$ of greater than 15 000 g/mol in only 2 to 7 hours and with a yield of at least 90%, indeed even of close to 99%, without it being necessary to operate under pressure. This is a considerable advantage of the process according to the invention.

This process is in addition preferably carried out with stirring. It can be carried out continuously or batchwise.

The homopolymers prepared according to the present invention exhibit a number-average molecular weight, denoted by $M_n$, measured by gel permeation chromatography (or GPC) and controlled by the molar ratio of the monomer to the initiator, which can be greater than 15 000 g/mol. In addition, they exhibit a polydispersity index, reflecting the good homogeneity in the chain lengths of the polymer, of less than 1.5.

These polymers can be used in a variety of applications and in particular as membranes for the treatment of liquid or gaseous effluents or in electrochemical energy storage systems, such as lithium ion batteries, supercapacitors or fuel cells; as biocompatible materials which can be used in particular in the pharmaceutical or cosmetic field, especially in the manufacture of systems for carrying active principles or as suturing materials; as additives in plastics and in particular as antistatic additives for polymeric resins, such as polyesters, polycarbonates, polyamides or poly(meth)acrylates, as compounds which improve the impact strength of resins, such as polycarbonates, which may or may not be transparent, polyesters, polyamides or poly(meth)acrylates, or as plasticizers for PVC; or in the manufacture of textile fibers.

The invention thus also relates to the use, as antistatic additive for polymeric resins, of a polymer composition capable of being obtained according to the process described above.

In addition, it relates to the use of this composition in the manufacture of a membrane for the treatment of liquid or gaseous effluents or in electrochemical energy storage systems; as biocompatible material in the pharmaceutical or cosmetic field; as additive which improves the impact strength of resins or as plasticizer for PVC; or in the manufacture of textile fibers.

The invention will now be illustrated by the following nonlimiting examples.

EXAMPLES

Example 1

Preparation of ϵ-Caprolactone Homopolymers

The following general procedure was used to carry out the processes described below.

The alcohols and the toluene were distilled over sodium. The ϵ-caprolactone and the δ-valerolactone were dried and distilled over $CaH_2$. The sulfonic acids were used without additional purification. The diisopropylethylamine (DIEA) was dried and distilled over calcium hydride ($CaH_2$) and stored over potassium hydroxide (KOH).

The Schlenk tubes were dried with a heat gun under vacuum in order to remove any trace of moisture.

The reaction was monitored by $^1$H NMR, carried out on a Bruker Avance 300 device, and GPC, carried out on a Waters 712 WISP device, regulated at 40° C., 1 ml/min, using polystyrene calibration. To do this, samples were withdrawn, neutralized with DIEA, evaporated and taken up in an appropriate solvent for the purpose of the characterization thereof. $^1$H NMR makes it possible to quantify the degrees of polymerization of the monomers (DP) by determining the integration ratio of the signals of the —$CH_2$— groups carrying the C=O functional group to the signals of the protons of the —$CH_2$— groups carrying the —OH functional group initially on the initiator. The spectra are recorded in deuterated chloroform on a 300 MHz spectrometer. GPC in THF makes it possible to determine the number-average molecular weight $M_n$ and the degree of polydispersity (PDI) of the samples.

Example 1A n-Pentanol (20 µl, 1 eq.) and trifluoromethanesulfonic acid (16 µl, 1 eq.) are successively added to a solution of ϵ-caprolactone (200 µl, 10 eq., 2.7 mol.l$^{-1}$) in toluene (0.43 ml). The reaction medium is stirred under argon at 30° C. until conversion of the monomer, established from NMR, is complete, i.e. 20 min.

Conversion: ≥99%
$^1$H NMR: DP=11
GPC: $M_n$=2200 g/mol, PDI=1.19

Example 1B n-Pentanol (25 µl, 1 eq.) and trifluoromethanesulfonic acid (20 µl, 1 eq.) are successively added to a solution of ϵ-caprolactone (1 ml, 40 eq., 2.7 mol.l$^{-1}$) in toluene (2.3 ml). The reaction medium is stirred under argon at 30° C. until conversion of the monomer, established from NMR, is complete, i.e. 1 h.

Conversion: 100%
$^1$H NMR: DP=39
GPC: $M_n$=8000 g/mol, PDI=1.16

Example 1C n-Pentanol (10 µl, 1 eq.) and trifluoromethanesulfonic acid (8 µl, 1 eq.) are successively added to a solution of ϵ-caprolactone (1 ml, 100 eq., 0.9 mol.l$^{-1}$) in toluene (9 ml). The reaction medium is stirred under argon at 30° C. until conversion of the monomer, established from NMR, is complete, i.e. 6 h 20.

Conversion: ≥99%
$^1$H NMR: DP=75
GPC: $M_n$=19 170 g/mol, PDI=1.19

Example 1D n-Pentanol (10 µl, 1 eq.) and methanesulfonic acid (6 µl, 1 eq.) are successively added to a solution of ε-caprolactone (1 ml, 100 eq., 2.7 mol.l$^{-1}$) in toluene (2.3 ml). The reaction medium is stirred under argon at 30° C. until conversion of the monomer, established from NMR, is complete, i.e. 5 h 30.
Conversion: 100%
$^1$H NMR: DP=79
GPC: $M_n$=16 700 g/mol, PDI=1.23

Example 1E n-Pentanol (50 µl, 1 eq.) and camphorsulfonic acid (107 mg, 1 eq.) are successively added to a solution of ε-caprolactone (510 µl, 10 eq., 2.7 mol.l$^{-1}$) in toluene (1.1 ml). The reaction medium is stirred under argon at 30° C. until conversion of the monomer, established from NMR, is complete, i.e. 33 min.
Conversion: 100%
$^1$H NMR: DP=9
GPC: $M_n$=1890 g/mol, PDI=1.22

These examples show that it is possible to obtain, in less than one hour and under mild conditions, polycaprolactones having relatively low molecular weights and, in less than 7 hours, polycaprolactones having molecular weights of greater than 15 000 g/mol.

Example 2

Preparation of δ-Valerolactone Homopolymers n-Pentanol (15 µl, 1 eq.) and trifluoromethanesulfonic acid (12 µl, 1 eq.) are successively added to a solution of δ-valerolactone (500 µl, 40 eq., 0.9 mol.l$^{-1}$) in toluene (5.5 ml). The reaction medium is stirred under argon at 30° C. until conversion of the monomer, established from NMR, is high (>90%), i.e. 15 min.
Conversion: 93%
$^1$H NMR: DP=36
GPC: $M_n$=5800 g/mol, PDI=1.15

Example 3 (Comparative)

Influence of the Solvent n-Pentanol (12 µl, 1 eq.) and trifluoromethanesulfonic acid (10 µl, 1 eq.) are successively added to a solution of ε-caprolactone (500 µl, 40 eq., 0.9 mol.l$^{-1}$) in dichloromethane (4.5 ml). The reaction medium is stirred under argon at 30° C. until conversion of the monomer, established from NMR, is complete.

The reaction time up to complete conversion is 7 h, whereas it is only 1 h 30 in the case where toluene is used as solvent under the same conditions.

The characteristics of the polymer obtained are as follows:
$^1$H NMR: DP=30
GPC: $M_n$=6260 g/mol, PDI=1.22
This example shows that the polymerization reaction is much faster in a nonchlorinated organic solvent.

What is claimed is:

1. A process for the preparation of a polylactone or polylactam, comprising reacting a lactone or lactam with a non-polymeric initiator in a nonchlorinated aromatic solvent in the presence of a sulfonic acid of formula R—SO$_3$H, where R denotes:
    a linear alkyl group including from 1 to 20 carbon atoms or a branched or cyclic alkyl group including from 3 to 20 carbon atoms, said alkyl groups are optionally substituted by one or more substituents chosen independently from oxo and halo groups, or
    an aryl group optionally substituted by at least:
        one linear alkyl substituent including from 2 to 20 carbon atoms, or one branched or cyclic alkyl group including from 3 to 20 carbon atoms, said alkyl substituent or group being itself optionally substituted by at least one halogen group chosen from fluorine, chlorine, bromine or iodine, or by a nitro group, or
        one halogen group chosen from fluorine, chlorine, bromine or iodine, or
        one nitro group, or
        one $CR_1R_2R_3$ group, where $R_1$ denotes a halogen atom and $R_2$ and $R_3$ independently denote a hydrogen atom or a halogen atom.

2. The process as claimed in claim 1, wherein the lactone is selected from the group consisting of ε-caprolactone, δ-valerolactone, β-butyrolactone and γ-butyrolactone.

3. The process as claimed in claim 2, wherein the lactone is ε-caprolactone.

4. The process as claimed in claim 1, wherein the lactam is selected from the group consisting of caprolactam, enantholactam, laurinlactam, pyrrolidinone and piperidone.

5. The process as claimed in claim 1, wherein the initiator is a compound of formula CH(Ra)(Rb)(XH) where X denotes O or S and Ra and Rb independently denote a hydrogen atom, a linear or branched $C_1$-$C_{22}$, alkyl group, an aryl group, or an arylalkyl group, the arylalkyl group including an alkyl chain of from 1 to 22 carbon atoms.

6. The process as claimed in claim 5, wherein X=O.

7. The process as claimed in claim 6, wherein the initiator is selected from the group consisting of methanol, ethanol, n-propanol, n-butanol, n-pentanol, n-hexanol, neopentyl alcohol and benzyl alcohol.

8. The process as claimed in claim 1 wherein the initiator is selected from the group consisting of bioethanol, starch, chitin, chitosan, dextran, cellulose, propanediol, glycerol, propylene glycol, isosorbide, xylitol, mannitol, maltitol, erythritol, fructose, ribose and glucose.

9. The process as claimed in claim 1, wherein the initiator is selected from the group consisting of methanethiol, n-propyl mercaptan, isopropyl mercaptan, butyl mercaptan, pentyl mercaptan, n-octyl mercaptan, t-nonyl mercaptan, n-dodecyl mercaptan, t-dodecyl mercaptan, 2-mercaptoethanol, 2-(4-methylcyclohex-3-enyl)propane-2-thiol and their mixtures.

10. The process as claimed in claim 1, wherein the process is carried out in an anhydrous medium.

11. The process as claimed in claim 1, wherein the sulfonic acid is (trifluoro)methanesulfonic acid.

12. The process as claimed in claim 1, wherein the molar ratio of the lactone or lactam to the initiator ranges from 5 to 500.

13. The process as claimed in claim 1, wherein the nonchlorinated solvent is an aromatic solvent.

14. The process as claimed in claim 1, wherein the molar ratio of the sulfonic acid of formula R—SO$_3$H to each hydroxyl or thiol functional group of the initiator is 1.

15. The process as claimed in claim 1, wherein the process is carried out at a temperature ranging from 20° C. to 105° C.

16. The process as claimed in claim 1, wherein the process does not employ a metal entity.

17. A polymer composition, characterized in that it is capable of being obtained according to the process as claimed in claim 1.

18. The use of the composition as claimed in claim 17 as an antistatic additive for polymeric resins.

19. The use of the composition as claimed in claim 17 in the manufacture of a membrane for the treatment of liquid or gaseous effluents or in electrochemical energy storage systems; as a biocompatible material in the pharmaceutical or cosmetic field; as an additive which improves the impact strength of resins or as plasticizer for PVC; or in the manufacture of textile fibers.

* * * * *